United States Patent [19]

Martin et al.

[11] Patent Number: 5,124,289
[45] Date of Patent: Jun. 23, 1992

[54] SURFACE TREATED PERMEABLE INORGANIC MEMBRANES AND PROCESS OF MAKING SAME

[75] Inventors: Edward S. Martin, New Kensington; Larry F. Wieserman; Karl Wefers, both of Apollo; Kathryn Cross, Murrysville, all of Pa.

[73] Assignee: Aluminum Company of America, Pittsburgh, Pa.

[21] Appl. No.: 265,179

[22] Filed: Oct. 31, 1988

Related U.S. Application Data

[63] Continuation-in-part of Ser. No. 23,423, Mar. 9, 1987, Pat. No. 4,788,176, which is a continuation-in-part of Ser. No. 946,870, Dec. 29, 1986, abandoned.

[51] Int. Cl.$^5$ ............ B01D 71/00; B01J 20/22; B01J 20/28
[52] U.S. Cl. .................... 502/4; 55/16; 55/158; 210/500.21; 210/500.25; 210/500.26; 210/500.27; 427/220; 427/244; 502/62; 502/401; 502/415
[58] Field of Search ............ 502/4, 62, 401, 415, 502/425; 55/16, 158; 210/500.21, 500.25, 500.26, 500.27; 427/220, 244

[56] References Cited

U.S. PATENT DOCUMENTS

| | | | |
|---|---|---|---|
| 3,013,904 | 12/1961 | Cupery | 117/76 |
| 4,202,798 | 5/1980 | Johnson et al. | 252/437 |
| 4,308,079 | 12/1981 | Venables et al. | 148/6.15 R |
| 4,382,016 | 5/1983 | Rickelton et al. | 252/428 |
| 4,506,628 | 3/1985 | Stockel | 119/1 |
| 4,598,056 | 7/1986 | Barraud et al. | 502/4 |

Primary Examiner—W. J. Shine
Attorney, Agent, or Firm—Andrew Alexander

[57] ABSTRACT

A treated permeable inorganic membrane is disclosed comprising a permeable inorganic membrane capable of reacting with an organic acid. The treated membrane has good chemical stability over a pH range of from 1 to 14, is capable of controlling the flux through the membrane, has altered internal and external wetting properties of the membrane surface, and has controlled pore size due to the presence of a monomolecular layer of an organic acid material chemically bonded to the surface of the inorganic membrane. The monomolecular layer of organic acid material is formed on the membrane surface by contacting the membrane with an organic acid reactant selected from the class consisting of phosphonic acid having the formula $RPO(OH)_2$; phosphinic acid having the formula $RR'PO(OH)$; monocarboxylic acids having the formula $RCOOH$; dicarboxylic acids having the formula $R''(COOH)_2$; boronic acid having the formula $RB(OH)_2$; and one or more precursors of the foregoing acids which decompose to form the acid functionality; where R comprises a 1–30 carbon-containing group, R' comprises hydrogen or a 1–30 carbon-containing group, and R" comprises a 2–30 carbon-containing group. Excess organic acid reactant not bonded to the underlying membrane surface is removed to ensure formation of said monomolecular layer of said organic acid material on the surfaces of said permeable inorganic membrane.

20 Claims, 2 Drawing Sheets

SURFACE TREATED PERMEABLE INORGANIC MEMBRANES AND PROCESS OF MAKING SAME

CROSS-REFERENCE TO RELATED APPLICATIONS

This application is a continuation-in-part of U.S. Ser. No. 023,423, filed Mar. 9, 1987, now U.S. Pat. No. 4,788,176, which is a continuation-in-part of U.S. Ser. No. 946,870, filed Dec. 29, 1986 (now abandoned), and is related to U.S. Ser. No. 023,312, filed Mar. 9, 1987, now U.S. Pat. No. 4,871,711, and U.S. Ser. No. 023,429, filed Mar. 9, 1987, now U.S. Pat. No. 4,786,628.

BACKGROUND OF THE INVENTION

1. Field of the Invention

This invention relates to treated permeable inorganic membranes which may be ceramic or metallic. More particularly, this invention relates to permeable inorganic membranes treated by coating the surface with a substantially monomolecular layer of an organic acid.

2. Description of the Related Art

Various inorganic membranes made from metals, inorganic polymers, and ceramics have been proposed for liquid and gas separations applications. The interest in utilizing such membranes in separations has increased since the advent of consistent quality, commerically available ceramic membranes with narrow pore size distributions. Inorganic membranes exhibit unique physical and chemical properties that are only partially or not shown by organic membranes. For example, they can be used at significantly higher temperatures, have better structural stability without the problems of swelling or compaction, generally can withstand more harsh chemical environments, are not subject to microbiological attack, and can be backflushed, steam sterilized, or autoclaved. Currently, microporous stainless steel, silver, carbon, and ceramic membranes such as alumina, zirconia, and glass are available commerically.

While inorganic membranes such as the ceramic membranes offer distinct advantages over the organic polymer membranes previously used, the pores of the inorganic membranes may also become blocked during usage. Pore blockage causes decreased permeability, flux, and efficiency of the membrane. Higher inlet pressures are then required to maintain a given flow rate. To restore membrane performance by reopening pores, strongly acidic solutions (e.g., 2 wt. % nitric acid or 2 wt. % hydrochloric acid), and/or strongly basic solutions (e.g., 2 wt. % sodium hydroxide) are used to dissolve the solid materials clogging the pores. However, most inorganic membrane materials, particularly ceramic materials such as alumina and silica, are also attacked by such aggressive solutions. Enlargement of the pore dimensions or even partial dissolution of the entire membrane material can result. In both cases the membrane may be rendered useless for the intended application.

It would, therefore, be advantageous to provide a treated permeable inorganic membrane which would provide the previously discussed advantages over organic membranes yet also exhibit greater chemical stability over a wide range of pH values to permit processing of the membrane to dissolve blockages without attack and destruction of the ceramic membrane itself.

In Wieserman U.S. patent application Ser. No. 946,870, cross-reference to which is hereby made, there is described a method for treating a metal oxide/hydroxide substrate to provide a monomolecular layer of a phosphonic or phosphinic acid thereon to stabilize the surface of the substrate over a wide pH range.

SUMMARY OF THE INVENTION

It is, therefore, an object of this invention to provide a treated permeable inorganic membrane having chemical stability over a wide pH range, capable of controlling the flux through the membrane, having altered internal and external wetting properties of the membrane surface, and with controlled pore size.

It is another object of this invention to provide a treated permeable inorganic membrane which is formed by treating, with an organic acid reactant selected from the class consisting of phosphonic acid having the formula $RPO(OH)_2$, phosphinic acid having the formula $RR'PO(OH)$, monocarboxylic acids having the formula $RCOOH$, dicarboxylic acids having the formula $R''(COOH)_2$, boronic acid having the formula $RB(OH)_2$, and precursors of the foregoing acids which decompose upon contact with the inorganic membrane to form the acid functionality, where R comprises a 1–30 carbon-containing group, R' comprises hydrogen or a 1–30 carbon-containing group, and R" the surface of a permeable inorganic membrane capable of reacting with the organic acid, and then removing the excess acid not bonded to the underlying inorganic membrane surface.

It is yet another object of this invention to provide a treated permeable inorganic membrane by treating the surface of a permeable inorganic membrane selected from the class consisting of metals and metal oxide/hydroxides of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In and Tl), IVb (Ge, Sn, and Pb), Vb (As, Sb, and Bi), elements in the lanthanide series and the actinide series, mixtures thereof, and mixtures of Groups IIa (Be, Mg, Ca, and Ra) and VIb (Se, Te, and Po) with an organic acid reactant selected from the class consisting of phosphonic acid having the formula $RPO(OH)_2$, phosphinic acid having the formula $RR'PO(OH)$, monocarboxylic acids having the formula $RCOOH$, dicarboxylic acids having the formula $R''(COOH)_2$, boronic acid having the formula $RB(OH)_2$, and precursors of the foregoing acids which decompose upon contact with the inorganic membrane to form the acid functionality, where R comprises a 1–30 carbon-containing group, R' comprises hydrogen or a 1–30 carbon-containing group, and R" the surface of a permeable inorganic membrane capable of reacting with the organic acid, and then removing the excess acid not bonded to the underlying inorganic membrane surface.

It is a further object of this invention to provide a treated permeable inorganic membrane by treating the surface of a permeable ceramic membrane selected from the class consisting of aluminum oxide, iron oxide, titanium oxide, zirconium oxide, zeolites, and combinations thereof with an organic acid reactant selected from the class consisting of phosphonic acid having the formula $RPO(OH)_2$, phosphinic acid having the formula $RR'PO(OH)$, monocarboxylic acids having the formula $R''COOH$, dicarboxylic acids having the formula $R(COOH)_2$, boronic acid having the formula $RB(OH)_2$, and precursors of the foregoing acids which decompose upon contact with the inorganic membrane to form the acid functionality, where R comprises a 1-30 carbon-containing group, R' comprises hydrogen or a 1-30 carbon-containing group, and R' the surface of a permeable inorganic membrane capable of reacting with the organic acid, and then removing the excess acid not bonded to the underlying ceramic membrane surface.

It is yet a further object of this invention to provide a treated permeable inorganic membrane by treating the surface of a permeable metal membrane selected from the class consisting of iron, stainless steel, nickel, chromium, gold, iridium, osmium, palladium, platinum, rhenium, ruthenium, silver, and Cr-Ni-Fe alloys commonly referred to as stainless steels, such as for example, SS304 and SS316; and combinations thereof with an organic acid reactant selected from the class consisting of phosphonic acid having the formula $RPO(OH)_2$, phosphinic acid having the formula $RR'PO(OH)$, monocarboxylic acids having the formula $RCOOH$, dicarboxylic acids having the formula $R(COOH)_2$, boronic acid having the formula $RB(OH)_2$, and precursors of the foregoing acids which decompose upon contact with the inorganic membrane to form the acid functionality, where R comprises a 1 to 30 carbon-containing group, R' comprises hydrogen or a 1 to 30 carbon-containing group, and R' comprises a 2 to 30 carbon-containing group, and then removing the exces acid not bonded to the underlying permeable metal membrane surface.

It is still another object of this invention to provide a treated permeable inorganic membrane of controlled permeability by treating the surface of a permeable inorganic membrane with an organic acid reactant selected from the class consisting of phosphonic acid having the formula $RPO(OH)_2$, phosphinic acid having the formula $RR'PO(OH)$, monocarboxylic acids having the formula $RCOOH$, dicarboxylic acids having the formula $R'(COOH)_2$, boronic acid having the formula $RB(OH)_2$, and precursors of the foregoing acids which decompose upon contact with the inorganic membrane to form the acid functionality, where R comprises a 1-30 carbon-containing group, R' comprises hydrogen or a 1-30 carbon-containing group, and R' comprises a 2 to 30 carbon containing group, wherein the length of the R and/or R' group is varied to vary and control the size of the pores in the treated permeable inorganic membrane, and then removing the excess acid not bonded to the underlying membrane surface.

It is a further object of this invention to provide a permeable aluminum oxide or zirconium oxide ceramic membrane having chemical stability over a wide pH range formed by treating the surface of the aluminum oxide or zirconium oxide ceramic membrane with a phosphorus-containing organic acid reactant selected from the class consisting of phosphonic acid having the formula $RPO(OH)_2$, phosphinic acid having the formula $RR'PO(OH)$, and precursors of the foregoing acids which decompose upon contact with the inorganic membrane to form the acid functionality, where R comprises a 1-30 carbon-containing group and R' comprises hydrogen or a 1-30 carbon-containing group, and then removing the excess acid not bonded to the underlying ceramic surface.

It is yet a further object of this invention to provide a method for making such treated permeable inorganic membranes.

These and other objects of the invention will be apparent from the following description and accompanying drawings.

DETAILED DESCRIPTION OF THE INVENTION

Figure 1:
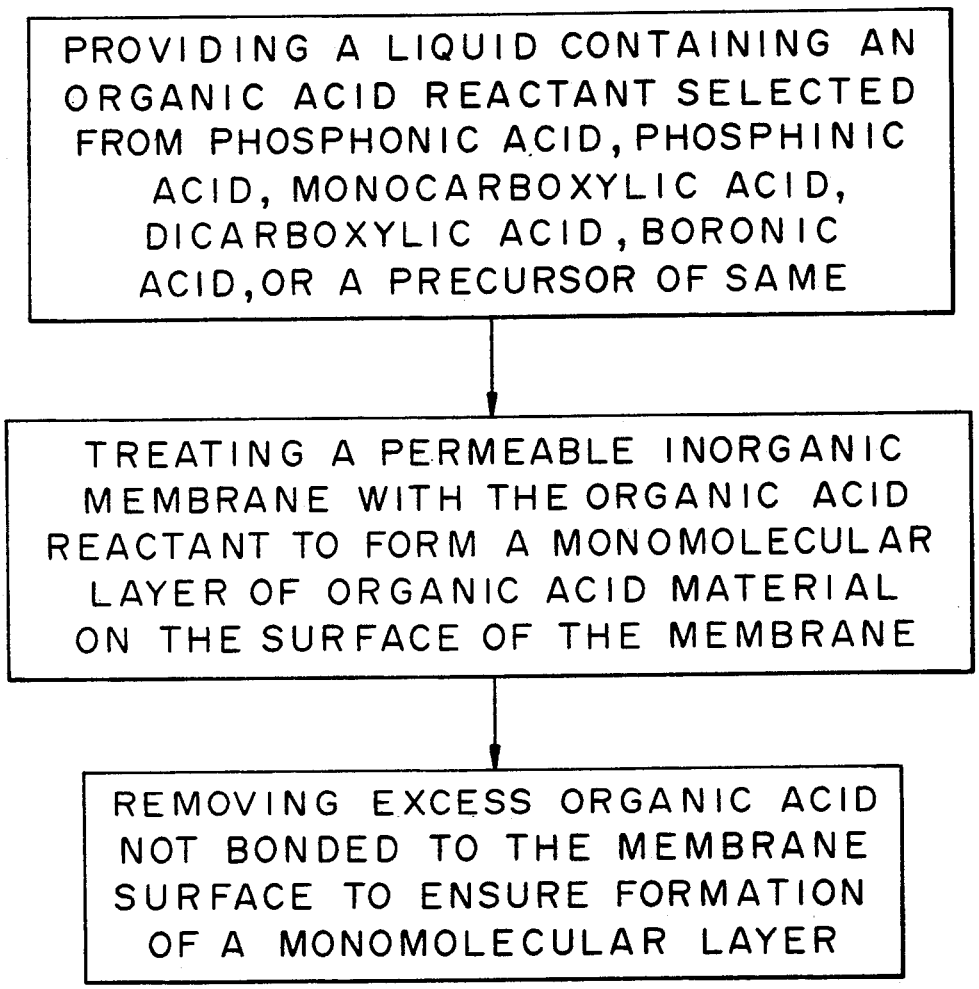
FIG. 1 is a flowsheet illustrating the process of forming the treated permeable inorganic membrane of the invention.

The invention provides an improved permeable inorganic membrane having enhanced chemical stability over a wide pH range extending from about 1 to about 14, which is capable of controlling the flux through the membrane, which has altered internal and external wetting properties of the membrane surface, and with controlled pore size due to the presence of a monomolecular layer of a material formed on the surface of the inorganic membrane. The monomolecular layer is formed by treating, with an organic acid reactant, a permeable inorganic membrane capable of reacting with the organic acid reactant to form a monomolecular layer, and then removing the excess acid not bonded to the underlying membrane surface.

The permeable inorganic membrane may comprise any permeable inorganic membrane capable of reacting with the organic acid to form a monomolecular layer of material on the surface thereof, including the surfaces of the pores.

The term "membrane", as used herein, is defined to include any physical barrier comprising porous bonded material acting as a filter by selectively passing one or more components while rejecting others from a gaseous or liquid mixture or solution of components.

Particularly preferred inorganic membranes are those formed from elements and their oxides capable of reacting with the organic acid reactant to form the surface modified permeable inorganic membrane of the invention selected from the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po).

Of the above metals, titanium, cobalt, zirconium, iron, Cr-Ni-Fe stainless steel alloys, nickel, chromium, and the precious metals, Ru, Os, Co, Rh, Ir, Pd, Pt, Ag, and Au are particularly preferred; while of the above metal oxides, aluminum oxide, iron oxide, titanium oxide, zirconium oxide, and zeolites are particularly preferred. In an especially preferred embodiment, the permeable inorganic membrane to be treated comprises aluminum oxide or zirconium oxide.

The pore diameters of the permeable inorganic membrane, prior to treatment in accordance with the invention may range from about 5 Å to about 1000 microns, preferably about 40 Å up to about 10 microns, while the pore diameters, after treatment with the organic acid material may range from about 0.1 Å to about 1000 microns, preferably about 35 Å up to about 10 microns.

It should be noted that while the porosity of the membrane materials has been discussed with regard to pore diameter, measurement of the porosity is sometimes referred to as the pore volume due to the nature of the nitrogen absorption measurement technique.

The organic acid reactant which is reacted with the permeable inorganic membrane is selected from the class consisting of phosphonic acid having the formula $RPO(OH)_2$, phosphinic acid having the formula $RR'PO(OH)$, mono and dicarboxylic acids having the formula $R''(COOH)_{1-2}$, boronic acid having the formula $RB(OH)_2$, and precursors of the foregoing acids which decompose upon contact with the inorganic membrane to form the acid functionality, where $R'$ may be hydrogen, both R and $R'$ may each be comprised of 1-30, preferably 5-30, carbon-containing groups such as an alkyl group, and $R''$ may be a 2 to 30 carbon-containing group.

Other examples of groups which may, in appropriate case comprise R and/or $R'$ and/or $R''$ include long and short chain aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, sulfur containing organic compounds, ureas, thioureas, perfluoro organic groups, perchloro organic groups, perbromo organic groups, and combinations of these groups. The organic acid molecules such as listed above may also include inorganic groups substituted thereon such as halogens, nitrates, phosphates, halogens, nitrates, phosphates, phosphinates, phosphinites, phosphonates, quaternary ammonium salts, and the like.

Preferably, the groups which may comprise R and/or $R'$ and/or $R''$ include long and short chain aliphatic hydrocarbons, aromatic hydrocarbons, amines, imides, anilines, pyridines, piperidines, carbohydrates, thiocyanates, ethers, alkenes, alkynes, alcohols, nitriles, organosilicones, sulfur containing organic compounds, perfluoro organic groups, perchloro organic groups, perbromo organic groups, and combinations of these groups.

Examples of organic acid reactants which may comprise precursors which may partially decompose upon contact with the permeable inorganic membrane to form the acid functionality capable of reacting with the inorganic membrane may include, the anhydrides and acid halides.

The size of the R or $R'$ group on the organic acid molecule may also be used to regulate or alter the pore size of the permeable inorganic membrane by, for example, increasing the length of the chain of the R group to decrease the pore size. In addition, it must be noted that the effective pore size may also be changed by the type of organic acid molecule without changing the physical size of the pore, such as, for example, when the hydrophobicity of the pore is changed.

Figure 2A:
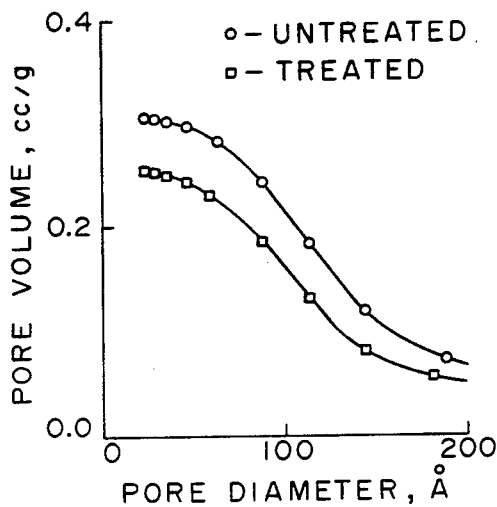
FIG. 2A is a graph showing the changes in pore volume of permeable alumina of various pore sizes after treatment with phenyl phosphonic acid.
Figure 2B:
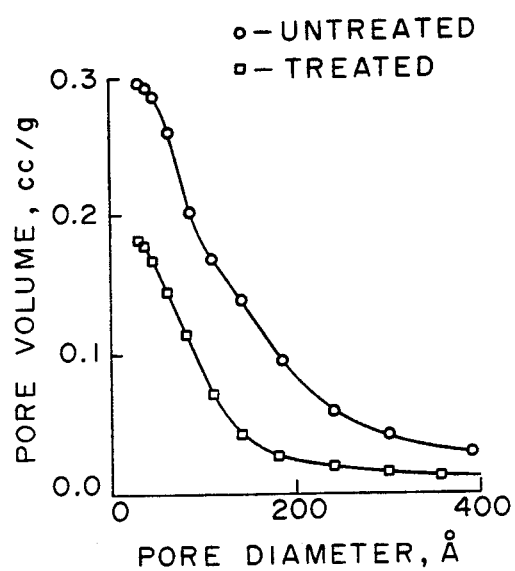
FIG. 2B is a graph showing the changes in pore volume of permeable alumina of various pore sizes after treatment with octadecyl phosphonic acid.
Figure 3A:
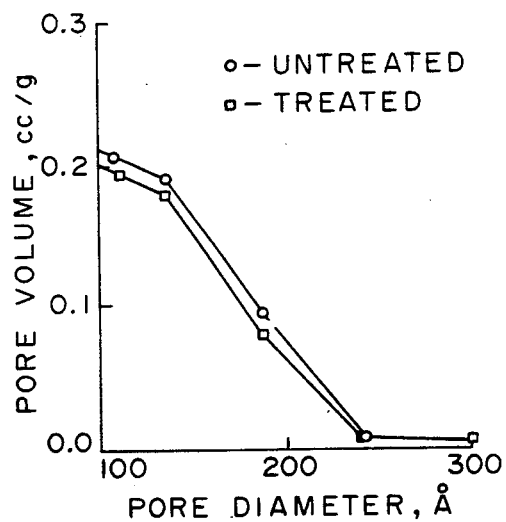
FIG. 3A is a graph showing the changes in pore volume of permeable zirconia of various pore sizes after treatment with phenyl phosphonic acid.
Figure 3B:
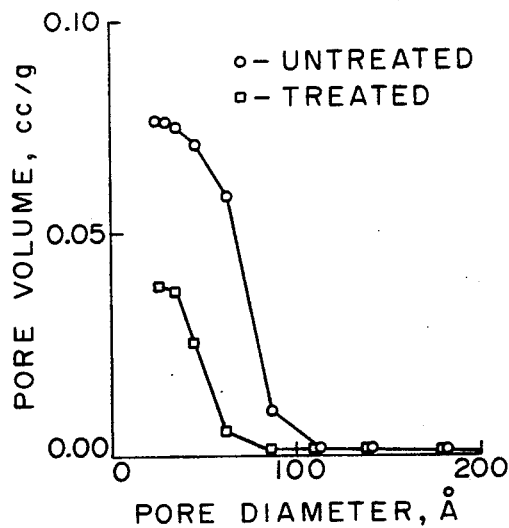
FIG. 3B is a graph showing the changes in pore volume of permeable zirconia of various pore sizes after treatment with octadecyl phosphonic acid.

Thus, by way of example, referring to FIGS. 2A and 2B, when porous aluminas of various pore sizes were treated respectively with phenyl phosphonic acid and octadecyl phosphonic acid, the physical pore size was reduced to a greater extent by the larger octadecyl radical than the phosphonic acid with the phenyl radical. Similar results are shown in FIGS. 3A and 3B in which porous zirconia particles of various pore sizes are also treated respectively with phenyl phosphonic acid and octadecyl phosphonic acid.

While it is preferred that the free end of the organic acid molecule extends away from the surface of the permeable inorganic membrane, it is within the scope of the present invention to provide, on the free end of the molecule, functional groups. Functional groups may be defined as the group on the molecule which enables the bonded monomolecular layer (comprising the organic acid bonded to the surface of the permeable inorganic membrane) to react with, attract, couple to, bond with, etc. other atoms, ions and/or molecules. By attaching specific functional groups, either organic or inorganic, to the R, $R'$ and $R''$ groups of the organic acids, a wide variety of selectivities and capacities are provided.

The functional groups attached to or contained within the free end can be selected from cation exchange functional groups and anion exchange functional groups such as $-SO_3H$, $-N^+(CH_3)_3Cl$, $-COONa$, $-NH_2$ and $-CN$, for example. The $-SO_3H$ functional group permits removal of cations such as $Cu^{+2}$, $Fe^{+2}$, $Co^{+2}$, $Cd^{+2}$, $Ca^{+2}$, $Sr^{+2}$, $Hg^{+2}$, $Pb^{+2}$, $Ba^{+2}$, and $Be^{+2}$, from aqueous media. The functional group, $-CH_2N(CH_3)_3Cl$, permits removal of anions such as $HSO_4^-$, $ClO_3^-$, $NO_3^-$, $NO_2^-$, $HPO_4^-$, formate, and citrate. Other examples of functional groups that may terminate the free end of the organic acid chain include the following: a glucose group, a monoclonal antibody, a cyano group ($-CN$), a cyanate group, isocyanate group, a phenyl group, a diphenyl group, a tertiary butyl group, a sulfonic group, a benzyl sulfonic group, protein groups such as protein A (staphytococcal protein A), enzyme groups, dye molecules, chelated metal groups, tag molecules and combination of these groups. Further, it should be noted that the carbon group can be a saturated or unsaturated carbon chain.

It will be noted that the R or $R'$ groups are always monomers or oligomers. Preferably, the oligomers have a molecular weight of less than 2000. By the use of monomer herein is meant to include a chemical compound that can undergo polymerization. By oligomer is meant a polymer or polymer intermediate containing relatively few structural units, i.e., a polymer containing 2-4 monomers.

The use of the term "metal oxide/hydroxides" herein is intended to define a broad spectrum of oxides ranging from those which may contain few hydroxides, e.g., activated forms of aluminum oxide (alumina) to more hydrated forms which may comprise mainly hydroxide, e.g., $Al(OH)_3$. It has been found, however, that the metal hydroxide form, rather than the metal oxide form, provides a better bond with the phosphorus-containing acid group on the organic molecule with which it is reacted. However, for certain applications, dehydrated or activated forms of the metal oxide/hydroxide may be preferred due to the higher surface area of such particles. For example, when aluminum oxide/hydroxide is used, the hydrated form will be preferred, e.g., gibbsite, bayerite, or boehmite will be preferred when a large external surface area is desired and activated alumina will be preferred when it is desirous that the metal oxide/hydroxide have a high internal surface area.

As presently understood, the permeable inorganic membranes suitable for use in the present invention usually require hydroxyl groups on the surfaces thereof for purposes of providing bonding sites for the acid group or groups of the organic acid, i.e., hydroxyl groups on the inorganic membrane surfaces react to form a chemical bond with the organic acid groups. For example, when the permeable inorganic membrane is alumina, hydroxyl groups on the surface of the alumina react with the acid group or groups of the organic acid, e.g., with the —POOH acid group of the phosphonic or phosphinic acid. It will be appreciated that if more than a monolayer of hydroxyl units are present on the membrane surfaces, such as hydroxyl units present as a result of water, this additional water layer can act to hinder the reaction. Thus, while it is preferred to have a maximum of a monolayer of hydroxyl units, less than a complete surface layer of hydroxyl units can be present on the permeable inorganic membrane and such does not hinder reactivity between the permeable inorganic membrane and the organic acid.

To produce the treated permeable inorganic membrane of the invention, the surface of the permeable inorganic membrane is contacted with one or more organic acids e.g., one or more phosphonic acids of the types discussed. This may be carried out by passing or pumping the organic acid through the permeable inorganic membrane. The permeable inorganic membrane, e.g., alumina or zirconia, may be reacted with the organic acid in a suitable media including an aqueous or nonaqueous solution, emulsion or suspension which may range from just above the freezing point up to the boiling point, or about 5° to 150° C., typically from about 10° C. up to about 90° C., preferably about 50° C., for a period of from at least 0.01 second to not more than 20 hours, and preferably from at least about 0.5 hours up to about 4 hours, using an initial acid concentration of at least about 0.0001 to 0.1 molar. In some instances higher concentrations may be desired. When the media is non-aqueous, the temperature range can be greatly extended. For example, it may range from 5° C. or lower to 200° C. or sometimes higher depending on the solvent.

The reaction is normally carried out at atmospheric pressure. However, the use of an elevated pressure or a subatmospheric pressure should be deemed to be within the scope of the invention. A flowing bed reactor or an aerosol may also be utilized in the treatment of the permeable inorganic membrane with the organic acid.

The thickness of the resulting organic acid monomolecular layer bonded to the permeable inorganic membrane is in the range of 2 to 5000 Å and preferably 3 to 500 Å.

The process should be controlled so as to prevent the R or R' groups from bonding to each other to form weakly adsorbed multilayers which would then provide further hydroxyl units, i.e., —POOH units directed away from and not bonded to the surface of the membrane, thereby defeating the purpose of the invention, for example, when it is used for an adsorbent.

In accordance with the invention, to ensure formation of only a monomolecular layer of the organic acid molecules on the surface of the permeable inorganic membrane, the treated surface is then washed with any solvent which is capable of removing excess organic acid molecules which are bound to other organic acid molecules, i.e., are not chemically bound to the surfaces of the permeable membrane, and which will not attack the organic acid molecules already chemically bonded to the membrane surfaces. In a preferred embodiment, a sodium hydroxide solution, having a concentration ranging from at least about 0.001 molar, e.g., about 0.001 to 1 molar, and buffered with sufficient sodium bicarbonate to maintain the pH in a range of from about 9-12, may be used as the wash solution to remove the excess organic acid molecules, leaving only the desired bonded monomolecular layer. Other wash solutions which may be used instead of the sodium hydroxide include potassium hydroxide and ammonium hydroxide solutions which may also be buffered to provide approximately the same pH range.

The wash solution may also comprise a weak acid such as a carboxylic acid, e.g., acetic or formic acid or a weak mineral acid (0.1-2N) such as sulfuric, nitric, or hydrochloric acid. The wash solution might also comprise an alcohol such as isopropanol or butanol. However, the use of bases as wash solutions are preferred since the resulting salts, e.g., sodium or potassium salts, are more soluble.

While we do not wish to be bound by any particular theory of bonding, it is believed that when the surface of the permeable inorganic membrane, for example, alumina, is brought into contact with the organic acid, a reaction or adsorption of the acid on the alumina takes place in which the metal, e.g., aluminum, and phosphorus/carbon/boron atoms in the respective acid molecules are apparently bonded together through an oxygen atom as illustrated in the formulas below, which show alumina, by way of example, as the permeable inorganic membrane:

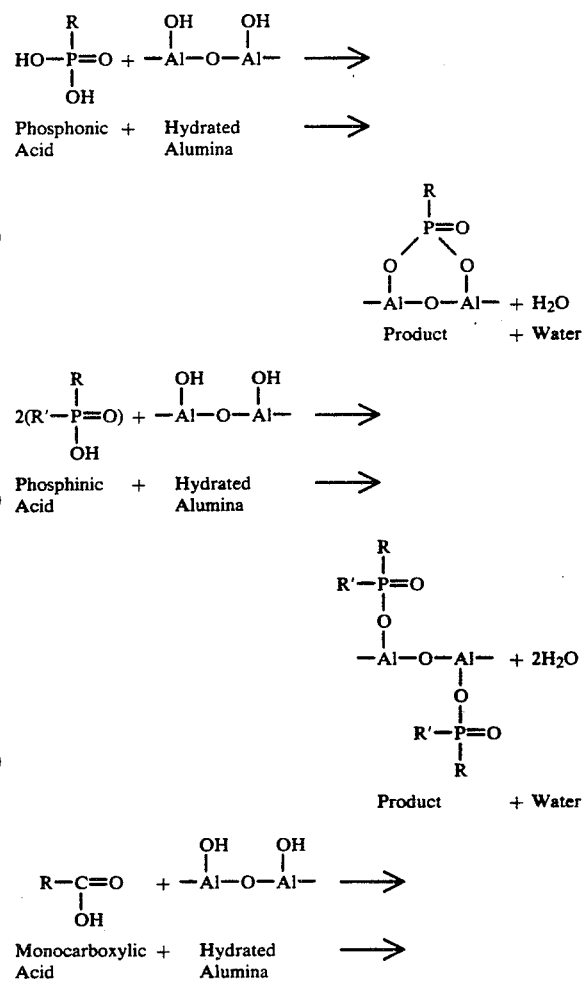

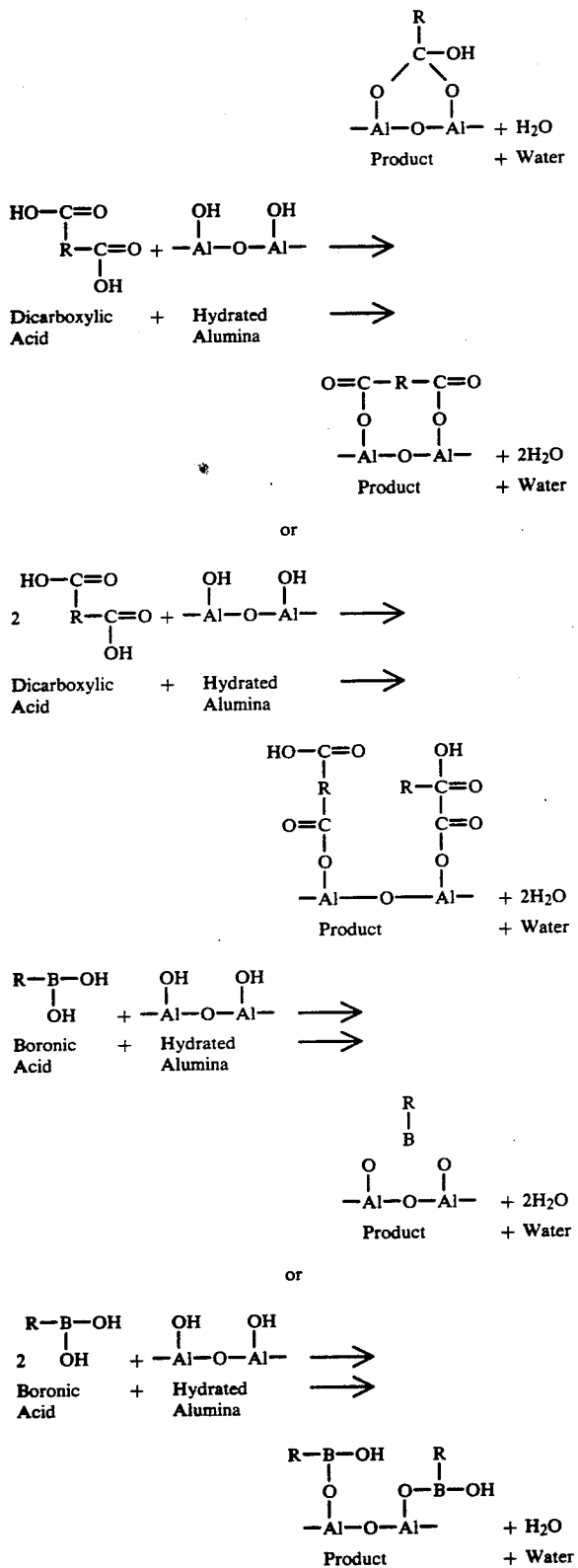

Note:
Aluminum ions may be an octrahedrally or tetrahedrally coordinated cation with or without coordination vacancies at or near the surface (external or within pore structures).

Thus it can be seen, using the above proposed models, that if all, or substantially all, of the exposed hydroxyl groups on the surface of the alumina can be reacted with the acid groups, the surface chemistry of the reacted permeable inorganic membrane, e.g., alumina will be changed. Furthermore, the type of organic radical attached to the organic acid can be tailored to achieve certain types of affinities to provide selectivity in the characteristics of the product.

By reaction of "substantially all" of the hydroxyl groups on the surface of the permeable inorganic membrane is meant reaction of at least 30% of the hydroxyl groups, and preferably 99% of such hydroxyl groups to ensure bonding to substantially all of the reactive sites which could otherwise be attacked by the acids or bases used, for example, to unclog the pores of the membrane after usage.

It should be noted that in the above models, two different bonding schemes are shown for the dicarboxylic acid and the boronic acid illustrating, respectively, where both acid groups on the diacid molecule are bonded to free hydroxyls on the surface of the permeable inorganic membrane, and where only one of the acid groups is bonded to the surface. While the former will be the conventional case, there may be circumstances where it is desirable to provide a free polar end to the organic acid molecule, depending upon the intended use of the treated permeable inorganic membrane. Such a free end can be provided by treating the permeable inorganic membrane with an excess of boronic acid or dicarboxylic acid, while reaction of both free ends of such difunctional acids may be assured by using a stoichiometric amount of such acid approximately equivalent to half of the hydroxyl groups present on the surface of the permeable inorganic membrane.

By "monomolecular layer" is meant that 90%, and preferably 98%, and most preferably substantially all of the organic acid molecules remaining on the surface of the metal or metal oxide/hydroxide membrane are bonded to the surface of the permeable inorganic membrane as a single layer of molecules. Thus, a monomolecular layer of organic acid reactant is chemically bonded to at least 90%, preferably 99%, of the reactive sites on the permeable inorganic membrane surface.

As noted earlier, while it is desired to avoid organic polymers where the chain has repeating phosphorus-containing groups which can bond to the metal oxide particle surface, oligomers having preferably a single phosphorus-bonding group are utilized. The single phosphorus-bonding group permits the oligomer to have a free end which extends away from the metal oxide particle surface.

It is preferred that the monomer or oligomer used is comprise at least a five-carbon chain. The chain may have 20 to 30 or more carbons, as noted earlier. If desired, the longer chains may be used in the initial bonding or loading of the permeable inorganic membrane with the organic acid material. However, because of the pores and fissures that comprise the surface of the permeable inorganic membrane, often all the surface hydroxyl units are not reacted because of the inability of the longer chain organic acid material reaching or diffusing into the pores and fissures. Thus, to inert or block remaining reactive sites, short-chain monomers or oligomers, e.g., less than 6 carbon molecules per chain, may be used. In this way, all of the reactive sites may be capped or blocked if desired. That is, for capping off the reactive sites, short-chain monomers can be used. For example, an alumina treated with a high molecular weight phosphonic or phosphinic acid, e.g. an n-heptadecylphosphonic acid, may be further treated with a low molecular weight phosphonic acid, e.g., methylphosphonic acid, to treat any remaining unreacted alumina surface areas.

In the present invention, the weight of the monomolecular layer on the permeable inorganic membrane may range from about $10^{-6}$ to 75 wt. % calculated on the total weight of the coated membrane, and preferably the monomolecular layer may range from about $10^{-5}$ to 50 wt. %. For purposes of ensuring that a monomolecular layer of organic acid material is bonded to the surface of the permeable inorganic membrane, the application should be carefully controlled. That is, a monomolecular layer can be obtained, for example, by controlling the viscosity of the solution, the time of exposure in the solution, the concentration and volume of organic acid material in the solution, or the concentration of hydroxyl units on the membrane surface, as well as the previously discussed washing and rinsing of the treated surface to remove excess organic acid not bonded to the membrane surface.

To further enhance the performance of the coated permeable inorganic membrane, it may be desirable to first further coat the already coated surface with a surfactant or wetting agent, for example, to alter the surface properties of the organic acid coating on the membrane.

The following examples will serve to further illustrate the practice of the invention.

EXAMPLE I

An uncoated porous alumina membrane having an approximate pore diameter of 40 Å showed a water permeability of 1.6 liters/hour (l/h) under a pressure difference of 100 psig at 25° C. and the permeate contained less than 5 ppm Al. It was then used to filter a 2 wt. % NaOH solution. The corresponding permeability and Al concentration of the permeate were 2.9 l/h and 42 ppm, respectively. When the membrane was used to filter 2 wt. % HNO$_3$ solution, the permeability was 3.3 l/h and the permeate contained 10 ppm Al. The same membrane was subsequently coated with 0.01 molar octadecyl phosphonic acid. When a 2 wt. % NaOH solution was filtered through the coated membrane, the water permeability and the Al concentration in the permeate were 2.0 l/h and 10 ppm respectively, indicating an increase of the chemical resistance and a reduction of the pore size compared to the uncoated membrane. When the same coated membrane was used to filter a 2 wt. % HNO$_3$ solution, the same trends were observed.

EXAMPLE II

A 200 ml mixture of toluene and water having a Beckman DU-7 Spectrometer reading of 1.65 absorbance at 254 nanometers was passed through an uncoated porous alumina membrane having a pore size of about 40 Å. The spectrometer readings of the permeate samples at 15 ml, 35 ml, and 55 ml were 0.54, 0.39, and 0.57 respectively. When the same membrane, however, was coated with a monomolecular layer of phenylphosphonic acid and the same water/toluene mixture passed through the coated membrane, the spectrometer readings of the permeate samples at 15 ml, 35 ml, and 55 ml were 5.70, 2.88, and 2.10, respectively, thus exhibiting the surface alteration of the coated membrane from a hydrophilic membrane to a hydrophobic membrane.

Thus the invention provides an improved coated permeable inorganic membrane having improved chemical stability over a wide range of pH resulting in enhanced resistance to attack by either basic or acidic media. The bonded monomolecular layer of organic acid material formed on the surface of the permeable inorganic membrane not only protects the membrane, but also permits alteration of the surface chemistry of the membrane as well as permitting custom control of the porosity of the membrane by varying the size of the organic moiety in the organic acid molecule.

Having thus described the invention, what is claimed is:

1. A treated permeable inorganic membrane having a monomolecular layer of an organic material thereon and formed by treating the surface of a permeable inorganic membrane having oxide/hydroxide reactive sites with an organic acid to bond an acid group of the organic acid to the oxide/hydroxide sites on the membrane, the organic acid reactant selected from the class consisting of:
   (a) monocarboxylic acids having the formula RCOOH;
   (b) dicarboxylic acids having the formula R"(COOH)$_2$; and
   (c) boronic acid having the formula RB(OH)$_2$;
where R comprises a 1–30 carbon-containing group and R" comprises a 2–30 carbon-containing group and wherein excess organic acid material not bonded to the underlying membrane surface is removed.

2. The treated permeable inorganic membrane of claim 1 wherein said monomolecular layer of organic acid reactant is chemically bonded to at least 90% of the reactive sites on said permeable inorganic membrane surface.

3. The treated permeable inorganic membrane of claim 1 wherein said monomolecular layer of organic acid reactant is chemically bonded to at least 99% of the reactive sites on said permeable inorganic membrane surface.

4. The permeable inorganic membrane of claim 1 wherein said coated membrane has an average pore size of from about 0.1 Å to about 1000 microns in diameter.

5. The permeable inorganic membrane of claim 4 wherein said membrane comprises one or more oxides selected from the class consisting of aluminum oxide, iron oxide, titanium oxide, zirconium oxide, and zeolites.

6. The permeable inorganic membrane of claim 5 wherein said membrane comprises one or more oxides selected from the class consisting of aluminum oxide and zirconium oxide.

7. The permeable inorganic membrane of claim 6 wherein said membrane comprises aluminum oxide.

8. The permeable inorganic membrane of claim 6 wherein said membrane comprises zirconium oxide.

9. The permeable inorganic membrane of claim 4 wherein the thickness of said monomolecular layer of organic acid material chemically bonded to said membrane surface is in the range of 2 to 5,000 Å.

10. The permeable inorganic membrane of claim 9 wherein the thickness of said monomolecular layer of organic acid material chemically bonded to said membrane surface is in the range of 3 to 500 Å.

11. The permeable inorganic membrane of claim 4 wherein said R group of said organic acid material contains at least 5 carbon atoms.

12. The permeable inorganic membrane of claim 4 wherein said R group may comprise an organic radical selected from the class consisting of long and short chain aliphatic hydrocarbons, aromatic hydrocarbons, aldehydes, ketones, amines, amides, thioamides, imides, lactams, anilines, pyridines, piperidines, carbohydrates, esters, lactones, ethers, alkenes, alkynes, alcohols, nitriles, oximes, organosilicones, ureas, thioureas, perfluoro organic molecules, perchloro organic molecules, perbromo organic molecules and combinations of these groups.

13. The permeable inorganic membrane of claim 12 wherein said R group may have a functional group attached to a portion of said organic acid material spaced from the portion of said material bonded to said membrane surface and selected from the class consisting of a glucose group, a cyano group, a cyanate group, isocyanate group and thiocyanate group, a phenyl group, a diphenyl group, a tertiary butyl group, a sulfonic group, a benzyl sulfonic group, a halogen group, nitrate group, phosphate group, phosphinate group, phosphinite group, phosphonate group, quaternary ammonium salt group and combinations of these groups.

14. The permeable inorganic membrane of claim 12 wherein said R group may have a cation exchange functional group attached to a portion of said organic acid material spaced from the portion of said material bonded to said membrane surface and selected from the class consisting of $-SO_3H$, $-N^+(CH_3)_3Cl$, $-COONa$, $-NH_2$ and $-CN$.

15. The permeable inorganic membrane of claim 4 wherein said monomolecular layer of organic acid material is substantially free of hydroxyl groups after chemically bonding to said membrane surface.

16. A process for chemically bonding a monomolecular layer of an organic acid material to a permeable inorganic membrane having a surface provided with oxide/hydroxide reactive sites to form a coated membrane surface, which process comprises:

(a) providing a liquid containing an organic acid reactant selected from the class consisting of:
  (i) monocarboxylic acids having the formula RCOOH;
  (ii) dicarboxylic acids having the formula $R(COOH)_2$; and
  (iii) boronic acid having the formula $RB(OH)_2$;
  where R comprises a 1-30 carbon-containing group;

(b) contacting a surface of said permeable inorganic membrane with said liquid containing said organic acid reactant; thereby to bond an acid group of the inorganic acid to the oxide/hydroxide sites on said membrane surface; and (c) removing excess acid not bonded to the underlying membrane surface.

17. The process of claim 16 wherein said step of providing a liquid containing an organic acid reactant therein further comprises maintaining a concentration of said organic acid reactant in said liquid of at least about 0.001 molar.

18. The process of claim 16 wherein said step of contacting said membrane surface with said liquid containing said organic acid reactant further comprises maintaining said contact for from about 0.01 second to about 20 hours.

19. The process of claim 18 wherein said step of contacting said membrane surface with said liquid containing said organic acid reactant further comprises maintaining said contact for from about 0.5 to about 4 hours.

20. The process of claim 16 wherein said step of contacting said membrane surface with said liquid containing said organic acid reactant further comprises maintaining the temperature of the reactants within a range of about 5° to 150° C. during said contacting step.

* * * * *